(12) United States Patent
Qiao

(10) Patent No.: US 7,496,990 B2
(45) Date of Patent: Mar. 3, 2009

(54) MOWER FOLDING HANDLE

(75) Inventor: Yong Qiao, Suzhou (CN)

(73) Assignee: Positec Power Tools (Suzhou) Co., Ltd, Suzhou (CN)

( * ) Notice: Subject to any disclaimer, the term of this patent is extended or adjusted under 35 U.S.C. 154(b) by 0 days.

(21) Appl. No.: 11/903,485

(22) Filed: Sep. 20, 2007

(65) Prior Publication Data
US 2008/0078156 A1 Apr. 3, 2008

(30) Foreign Application Priority Data
Sep. 21, 2006 (CN) .................. 2006 1 0159452

(51) Int. Cl.
| A45C 3/00 | (2006.01) |
| A45C 7/00 | (2006.01) |
| A45C 13/22 | (2006.01) |
| A45C 13/26 | (2006.01) |
| A45F 5/19 | (2006.01) |
| A47J 45/00 | (2006.01) |
| B62D 51/00 | (2006.01) |
| E05B 1/00 | (2006.01) |

(52) U.S. Cl. ............................................ 16/437
(58) Field of Classification Search ............ 16/437, 16/438, 430, 445, 436; 280/655.1, 655, 652, 280/47.27, 47.26, 651, 47.371, 47.36; D15/14; 56/DIG. 18, 16.7, 17.5
See application file for complete search history.

(56) References Cited

U.S. PATENT DOCUMENTS

| 2,727,753 A | * | 12/1955 | Johnson et al. .......... 280/655.1 |
| 3,357,716 A | * | 12/1967 | Musichuk .............. 280/47.371 |
| 3,423,103 A | * | 1/1969 | Maltarp .................. 280/655.1 |
| 3,462,924 A | * | 8/1969 | Erickson et al. ............ 56/320.1 |
| 3,485,017 A | * | 12/1969 | Beares et al. ................ 56/17.5 |
| 3,527,469 A | | 9/1970 | Gobin |
| 3,534,432 A | * | 10/1970 | Davies et al. ................. 16/437 |
| 3,950,817 A | * | 4/1976 | McKaig ....................... 16/437 |
| 4,132,280 A | * | 1/1979 | Jones et al. ................ 180/19.3 |
| 4,294,027 A | * | 10/1981 | Edwards ...................... 37/259 |
| 4,392,538 A | | 7/1983 | Goertzen |
| 4,433,530 A | * | 2/1984 | Schaefer ..................... 56/11.8 |
| 5,062,179 A | * | 11/1991 | Huang ........................ 16/436 |
| 5,163,275 A | * | 11/1992 | Hare et al. .................. 56/16.7 |
| 5,168,601 A | * | 12/1992 | Liu ............................. 16/445 |
| 5,319,992 A | * | 6/1994 | Shui-Te ....................... 74/543 |
| D374,017 S | * | 9/1996 | Chunn et al. ................. D15/14 |
| 5,636,504 A | | 6/1997 | Kaley et al. |
| 6,101,678 A | * | 8/2000 | Malloy et al. ................ 16/438 |
| 6,345,836 B1 | * | 2/2002 | Wu .............................. 280/651 |
| 2006/0053762 A1 | * | 3/2006 | Stover et al. ................. 56/16.7 |

FOREIGN PATENT DOCUMENTS

JP  08172843 A  *  7/1996

* cited by examiner

Primary Examiner—Árpád Fábián-Kovács
(74) Attorney, Agent, or Firm—TraskBritt, PC

(57) ABSTRACT

The present invention relates to a lawn mower with a handle assembly comprising a lower frame and an upper frame which can be rotated to adjust its position with respect to the lower frame.

19 Claims, 14 Drawing Sheets

MOWER FOLDING HANDLE

BACKGROUND OF THE INVENTION

1. Field of the Invention

The present invention relates to a grass mower.

2. State of the Art

It is known to mount a lawn mower handle to the deck or housing of a lawn mower in various ways which permit adjustment of the handle assembly about a pivotal axis. The handle assembly is generally quite long and extends substantially rearwardly beyond the mower housing. The handle assembly generally comprises a lower frame including a pair of arms which are substantially parallel to each other and have one end secured to the housing and a generally U-shaped upper frame including a pair of free arms substantially parallel to each other and a closed end which is operated by the user to push the lawn mower along the ground. The distance between the two arms and the two free arms is substantially equal. During use, each arm of the lower frame is fixed to each free arm of the upper frame by a locking arrangement such as a bolt and nut. The locking arrangement can be manually released and the upper frame can be pivoted relative to the lower frame until the upper frame is substantially folded over the lower frame to allow the lower frame to be pivoted with respect to the housing until the lower frame overlies the housing for storage.

U.S. Pat. Nos. 3,527,469 and 5,636,504 disclose such a folded handle assembly including two means for respectively locking the side arms of the lower frame and the upper frame in its normal operational position. If only one side arm is locked, the handle assembly would twist when the operator pushed it because the unlocked handle arm could rotate with respect to the locked handle arm. However, it is an inconvenient and time consuming activity to lock both of the arms of the frames of the handle assembly. In addition, there is a risk that an operator will forget that both arms need to be unlocked before the handle assembly can be folded.

Moreover when it comes to adjusting the operating height of the handle assembly relative to the housing, the operator has to unlock both lower arms from the mower deck, pivot the handle assembly relative to the mower deck and lock the lower arms on the mower deck at the desired operating position. The connection between arm ends and mower deck is generally complex which makes the adjustment inconvenient.

BRIEF SUMMARY OF THE INVENTION

In order to overcome the foregoing disadvantages, it is an object of the present invention to provide a handle assembly for an outdoor equipment unit such as a lawn mower which can be quickly and easily folded for storage and can be conveniently adjusted at a plurality of height positions for the handle assembly with respect to the mower deck.

Thus viewed from a first aspect the present invention provides a grass mower comprising a main body capable of guided movement adjacent to and over the ground; an elongate handle assembly extending rearwardly from the main body into a handle to permit an operator to guide the main body during its guided movement over the ground, wherein the elongate handle assembly includes a lower frame provided with a first joint portion and an upper frame provided with a second joint portion; an elongate shaft for pivotally coupling the second joint portion to the first joint portion such that the relative position of the upper frame and the lower frame is rotationally adjustable; a first engaging unit carried on the first joint portion and a second engaging unit carried on the second joint portion, wherein either the first engaging unit is equipped with a plurality of engaging points is disposed along an arc around the elongate shaft, wherein the second engaging unit is selectively engageable with more than one selected one or set of the plurality of engaging points or the second engaging unit is equipped with a plurality of engaging points which is disposed along an arc around the elongate shaft, wherein the first engaging unit is selectively engageable with more than one selected one or set of the plurality of engaging points; and at least one locking arrangement for locking the position of selected engagement of the selected one or set of the plurality of engaging points with the first engaging unit or second engaging unit.

Typically, the plurality of engaging points is disposed along a substantially circular arc (e.g., with a substantially constant radius about the elongate shaft).

Typically, the at least one locking arrangement is a single locking arrangement.

Preferably, the locking arrangement is disposed adjacent to or along an axis of symmetry of the lower frame.

Preferably, the lower frame comprises a pair of substantially parallel lower arms extending rearwardly from the main body, wherein the upper frame comprises a pair of substantially parallel upper arms and a closed operator grip for the operator to hold.

In a preferred embodiment, the grass mower further comprises a first bracket mechanism mounted on the first joint portion; and a second bracket mechanism mounted on the second joint portion, wherein the first engaging unit is mounted in the first bracket mechanism and the second engaging unit is mounted in the second bracket mechanism.

Preferably, the first engaging unit is a tooth member and the second engaging unit is a movable tooth member, wherein the teeth of the tooth member are selectively meshable with more than one selected one or set of the teeth of the movable tooth member.

Preferably, the first bracket mechanism comprises an upper cover plate and a lower cover plate, wherein the tooth member is seated in a cavity on the upper cover plate, wherein the upper cover plate has a pair of substantially parallel spaced-apart, substantially semi-circular axial slots and the lower cover plate has a pair of substantially parallel spaced-apart, substantially semi-circular axial slots whereby the pair of substantially parallel lower arms are captured between the substantially parallel spaced-apart, substantially semi-circular axial slots of the upper cover plate and the substantially parallel spaced-apart, substantially semi-circular axial slots of the lower cover plate.

Preferably, the upper cover plate is mounted radially on the elongate shaft and the first bracket mechanism and the second bracket mechanism are pivotal about the elongate shaft.

Each of the upper cover plate and lower plate is typically multi-walled. The upper cover plate and lower cover plate are typically complementarily shaped.

Preferably, the tooth member has at least six (e.g., six) teeth disposed along an arc around an axis of the elongate shaft.

Preferably, the second bracket mechanism comprises an upper cover plate and a lower cover plate, wherein the movable tooth member is seated in a cavity in the upper cover plate, wherein the upper cover plate has a pair of substantially parallel spaced-apart, substantially semi-circular axial slots and the lower cover plate has a pair of substantially parallel spaced-apart, substantially semi-circular axial slots whereby the pair of substantially parallel upper arms are captured between the substantially parallel spaced-apart, substantially semi-circular axial slots of the upper cover plate and the substantially parallel spaced-apart, substantially semi-circular axial slots of the lower cover plate.

Each of the upper cover plate and lower plate is typically multi-walled. The upper cover plate and lower cover plate are typically complementarily shaped.

Preferably, the movable tooth member has at least three (e.g., three) teeth disposed along an arc around an axis of the elongate shaft.

Preferably, the locking arrangement comprises an axial spindle with a first end and a second end; and a cam locking member connected to the second end of the axial spindle, wherein the movable tooth member has a central bore for receiving the first end of the axial spindle. The cam locking member may be an eccentric rotary cam.

Particularly preferably, the locking arrangement further comprises a biasing element with a tendency (e.g., configured) to bias the movable tooth member into disengagement with the tooth member, wherein when the cam locking member is released the biasing element biases the movable tooth member into disengagement with the tooth member.

Preferably, the locking arrangement is a manually retractable locking member which is threadedly fastened to the movable tooth member.

Particularly preferably, the locking arrangement further comprises a biasing element with a tendency (e.g., configured) to bias the movable tooth member into engagement with the tooth member, wherein when the retractable locking member is retracted the biasing element releases the movable tooth member into disengagement from the tooth member.

Preferably, the second engaging unit is a plurality of slots in the second joint portion and the first engaging unit is a retractable latch fixed laterally to the first joint portion and having a proximal end and a distal end, wherein the locking arrangement comprises a biasing member mounted on the retractable latch with a tendency (e.g., configured) to bias the distal end into selected engagement with at least one slot of the plurality of slots when the retractable latch is unretracted, wherein the distal end of the retractable latch selectively disengages the at least one slot of the plurality of slots when the retractable latch is retracted; and an actuating member for retracting the retractable latch.

Particularly preferably, the grass mower further comprises a lateral slit in the second joint portion, wherein the proximal end of the retractable latch is biased into selective engagement with the lateral slit when the retractable latch is unretracted and wherein the proximal end of the retractable latch selectively disengages the lateral slit when the retractable latch is retracted.

Preferably, the lateral slit is in a first of the pair of substantially parallel upper arms and the plurality of slots is in a second of the pair of substantially parallel upper arms. Preferably, the slit and the slots are substantially parallel and coplanar.

Preferably, the plurality of slots is distributed along an arc with a radius about the shaft.

Preferably, the lateral slit extends along an arc with a substantially constant radius about the shaft.

Preferably, the grass mower further comprises a retainer fixed to a proximal end of the first joint portion in which is retractably mounted the retractable latch.

Preferably, the first engaging unit is a first pair of gears mounted on the outer face of the first joint portion and the second engaging unit is a second pair of gears mounted radially on the second joint portion, wherein either the first pair of gears is equipped with a plurality of engaging points which is disposed along an arc around the elongate shaft and the second pair of gears is selectively engageable with more than one selected one or set of the plurality of engaging points or the second pair of gears is equipped with a plurality of engaging points which is disposed along an arc around the elongate shaft, wherein the first pair of gears is selectively engageable with more than one selected one or set of the plurality of engaging points.

Preferably, the first and second pairs of gears and the joint portions are mounted radially on the elongate shaft, wherein the locking arrangement is a cam locking member coupled to a first end of the elongate shaft.

Preferably, the lower frame is a single arm connected to the main body at a proximal end and has a first joint portion disposed at the distal end, wherein the upper frame is a single arm which has an operating handle grip at a distal end and has a second joint portion being a fork at a proximal end.

Preferably, the first engaging unit is a first pair of gears mounted respectively on the outer face of the first joint portion and the second engaging unit is a second pair of gears mounted respectively on the inner face of the fork of the second joint portion, wherein either the first pair of gears is equipped with a plurality of engaging points which is disposed along an arc around the elongate shaft and the second pair of gears is selectively engageable with more than one selected one or set of the plurality of engaging points or the second pair of gears is equipped with a plurality of engaging points which is disposed along an arc around the elongate shaft, wherein the first pair of gears is selectively engageable with more than one selected one or set of the plurality of engaging points.

Preferably, the first and second pair of gears and the first and second joint portions are mounted on the elongate shaft and the locking arrangement is a cam locking member coupled to one end of the rotary elongate shaft.

Preferably, each set of the plurality of engaging points is circumferentially spaced apart on the arc. The more than one selected one or set of the plurality of engaging points may be more than two, preferably more than three.

BRIEF DESCRIPTION OF THE SEVERAL VIEWS OF THE DRAWINGS

The present invention will now be described in a non-limitative sense with reference to the accompanying Figures in which common reference numerals represent corresponding parts throughout.

DETAILED DESCRIPTION OF THE INVENTION

Figure 1:
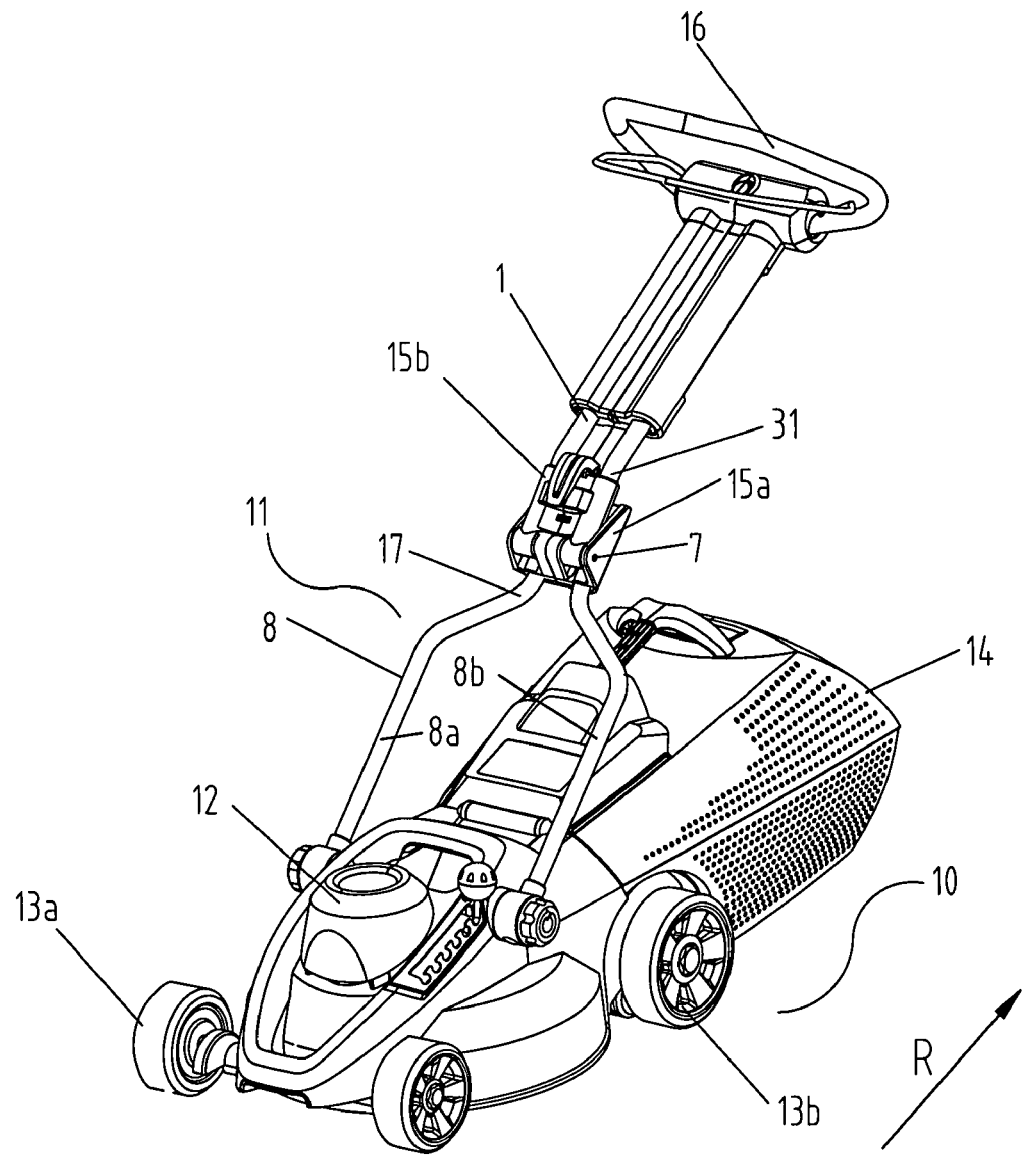
FIG. 1 is a perspective side view of a lawn mower according to a first embodiment of the present invention.

Referring to FIG. 1, a lawn mower according to a first embodiment of the invention comprises a main body 10, an elongate handle assembly 11 associated with the main body 10, a motor 12 contained in a motor housing of the main body 10 and a cutting unit driven by the motor 12 disposed under the motor housing (not shown). A pair of front wheels 13a is mounted beneath a front end of the main body 10 and a pair of rear wheels 13b is mounted beneath a rear end of the main body 10. A collection container 14 is releasably carried on a rear portion of the main body 10.

The elongate handle assembly 11 extends substantially rearwardly from the main body 10 (see arrow R) and comprises a lower frame 8 including a pair of substantially parallel lower arms 8a, 8b. The lower arms 8a, 8b each have a proximal end secured to the main body 10 and a distal end bent convergently to form a first joint portion 17. A first bracket mechanism 15a is secured to the first joint portion 17 and to an upper frame 1 which includes a pair of substantially parallel upper arms 1a, 1b extending into a closed operator grip 16. The upper arms 1a, 1b terminate in a second joint portion 31 at a proximal end. The distance between the distal ends of the lower arms 8a, 8b of the first joint portion 17 corresponds to the distance between the proximal ends of the upper arms 1a, 1b of the second joint portion 31. A second bracket mechanism 15b associated with the second joint portion 31 is pivotally coupled to the first bracket mechanism 15a by a spindle 7 such that the second bracket mechanism 15b is pivotal with respect to the first bracket mechanism 15a about the spindle 7.

Figure 2:
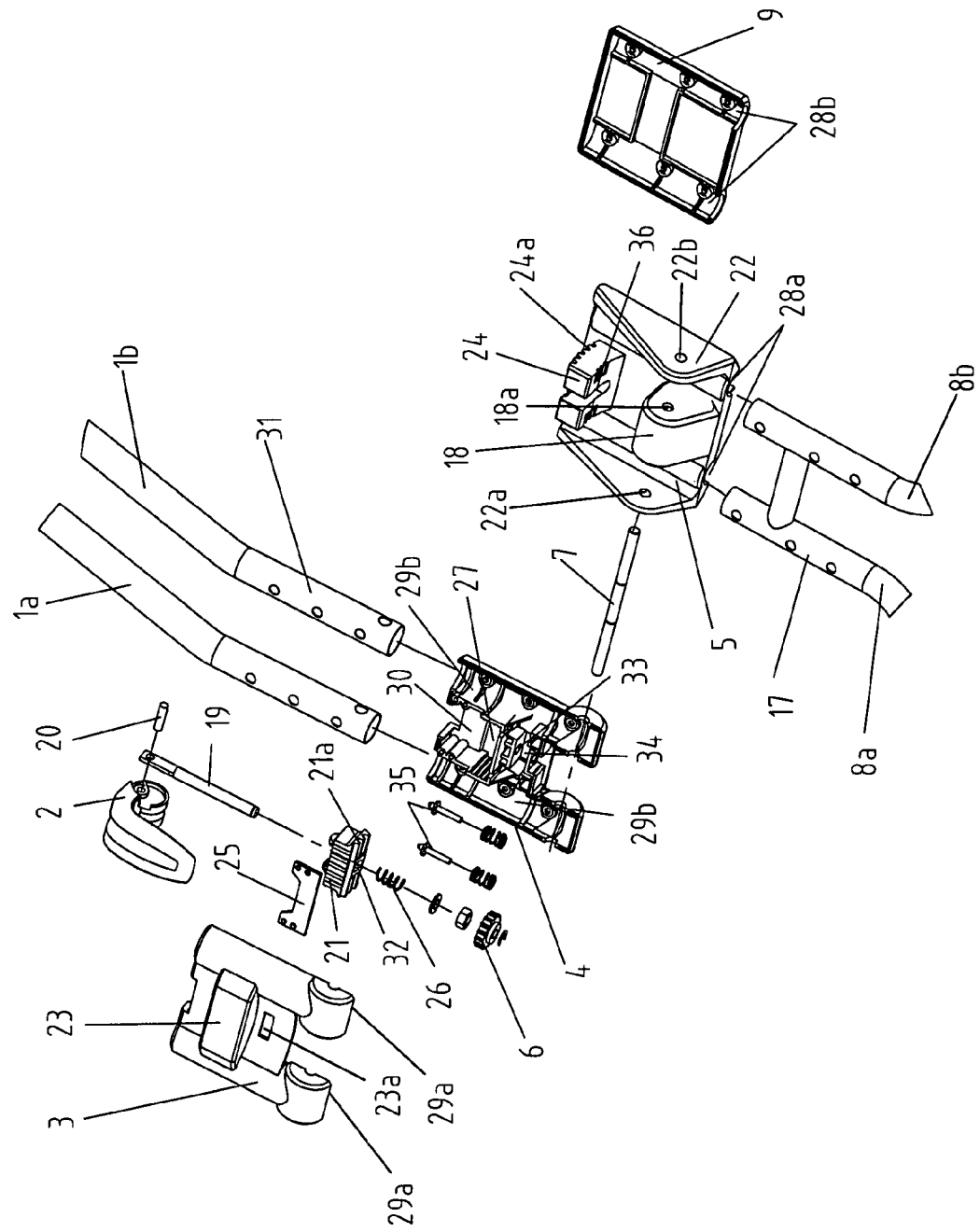
FIG. 2 is a partial exploded view of the handle assembly of the lawn mower show in FIG. 1.

Referring to FIG. 2, the first bracket mechanism 15a comprises an upper cover plate 5 and a lower cover plate 9 fixed to the upper cover plate 5 by screws or other fastening means. Each of a pair of opposed peripheral walls 22 extending from opposite edges of the exterior face of the upper cover plate 5 is equipped with a hole 22a, 22b. A support unit 18 is positioned between the pair of walls 22 and has a lateral bore 18a for the spindle 7 to extend through so that the spindle 7 is supported by the support unit 18 and terminates in the holes 22a, 22b. A tooth member 24 is secured to the exterior face of the upper cover plate 5. Six teeth 24a are disposed on a proximal face of the tooth member 24 and three slots 36 are disposed on an opposing distal face of the tooth member 24. Each of the proximal and distal faces forms a circular arc which is rotatable about the axis of the spindle 7. A pair of parallel spaced-apart semi-circular axial channels 28a is disposed on the basal interior face of the upper cover plate 5. A pair of parallel spaced apart semi-circular axial channels 28b is correspondingly disposed on the upper interior face of the lower cover plate 9. The first joint portion 17 is securely captured between the semi-circular axial channels 28a and the semi-circular axial channels 28b (i.e., between the basal interior face of the upper cover plate 5 and the upper interior face of the lower cover plate 9) when the lower cover plate 9 is fixed to the upper cover plate 5.

The second bracket mechanism 15b comprises an upper cover plate 3 and a lower cover plate 4 fixed to the upper cover plate 3 by screws or other fastening means. A projecting platform 23 is disposed on the exterior face of the upper cover plate 3. A pair of substantially parallel spaced-apart semi-circular axial channels 29a is disposed on the basal interior face of the upper cover plate 3. A pair of substantially parallel spaced-apart semi-circular axial channels is correspondingly disposed on the upper interior face of the lower cover plate 4. A cavity 27 for receiving the tooth member 24 is disposed on the lower cover plate 4 and a first cavity 30 for receiving a movable tooth member 21 is disposed adjacent to the cavity 27 on the lower cover plate 4. A second cavity is correspondingly formed on the basal interior face of the upper cover plate 3 (unseen in FIG. 2). The movable tooth member 21 is received in the first cavity 30 and the second cavity and the second joint portion 31 is securely captured between the channels 29a and the channels 29b (i.e., between the basal interior face of the upper cover plate 3 and the upper interior face of the lower cover plate 4) when the lower cover plate 4 is fixed to the upper cover plate 3. The movable tooth member 21 is made of a rigid material such as steel. A platen 25 disposed between the movable tooth member 21 and the upper cover plate 3 decreases the distortion of the upper cover plate 3 when it comes into contact with the movable tooth member 21. The base of the lower cover plate 4 for supporting the movable tooth member 21 may be made thicker.

A plurality of teeth 21a are formed on a proximal face of the movable tooth member 21 for selectively engaging the teeth 24a on the proximal face of the tooth member 24. A central bore 32 formed in the movable tooth member 21 receives an axial spindle 19 which has a first end coupled to a locking member 2 via a pin 20 and a second end screwed onto a micro-adjusting screw 6 through an aperture 33 formed on ribs of the lower cover plate 4. A spring 26 is mounted on the axial spindle 19. The micro-adjusting screw 6 is seated in a cavity 34 in the upper interior face of the lower cover plate 4 and has an upper surface extending out of an aperture 23a in the upper cover plate 3 for manual actuation. Two locating pins 35 are positioned in the cavity 34 and a spring is mounted on each locating pin 35. The locating pins 35 selectively engage the slots 36 of the tooth member 24 when the tooth member 24 is seated in the cavity 27 of the lower cover plate 4.

The teeth 24a engage the teeth 21a in three different ways corresponding to the engagement of the locating pins 35 and the slots 36 such that a clear sound is emitted from the locating pins 35 and the slots 35 when the teeth 24a selectively engage the teeth 21a in these different positions. Because the engagement of the teeth 24a and the teeth 21a rely on design tolerance and abrasion, the micro-adjusting screw 6 is used to adjust the position of the movable tooth member 21 relative to the spindle 7. The micro-adjusting screw 6 is operable to rotate clockwise or anti-clockwise on the axial spindle 19 and cause the spring 26 to urge the movable tooth member 21 to slide on the axial spindle 19 such that the distance between the tooth member 24 and the movable tooth member 21 can be micro-adjusted.

The locking member 2 is a cam member rotationally coupled to the spindle 19 by the pin 20. The engagement positions of the movable tooth member 21 and the tooth member 24 can be effectively locked via the cam locking member 2.

Figure 3:
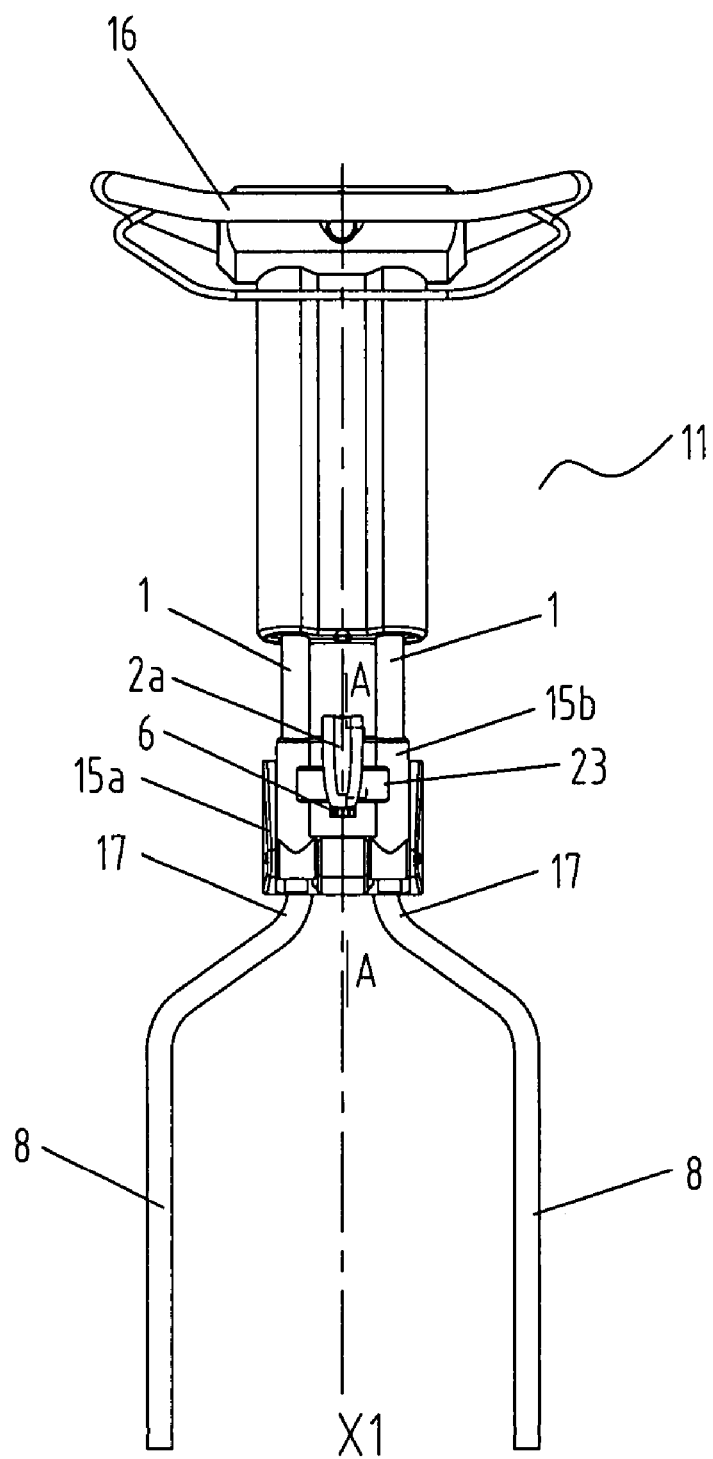
FIG. 3 is a front view of the of the handle assembly of the lawn mower shown in FIG. 1, wherein the upper frame is fixed to the lower frame.

Referring to FIG. 3, a longitudinal axis of symmetry X1 is defined between the lower arms 8a, 8b of the lower frame 8. The cam locking member 2 has a knob 2a which is positioned on the axis X1.

Figure 4C:
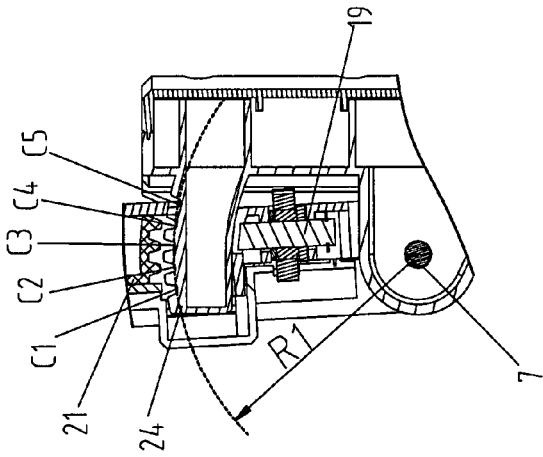
FIG. 4C is a partial enlarged view according to FIG. 4B.
Figure 4B:
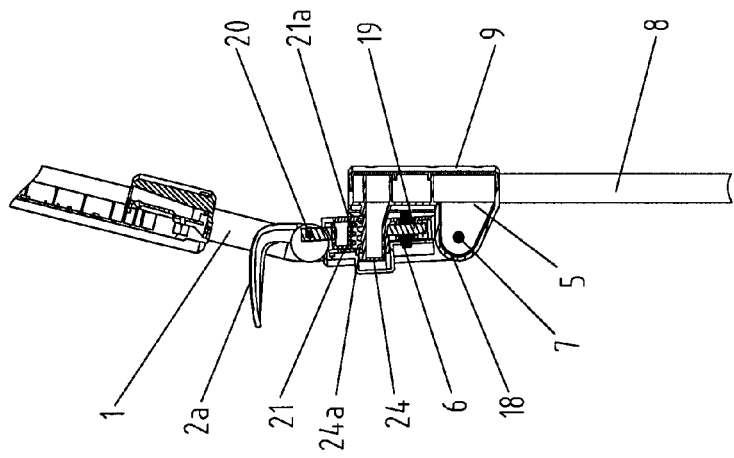
FIG. 4B is an enlarged view according to FIG. 4A, wherein the locking arrangement is released.
Figure 4A:
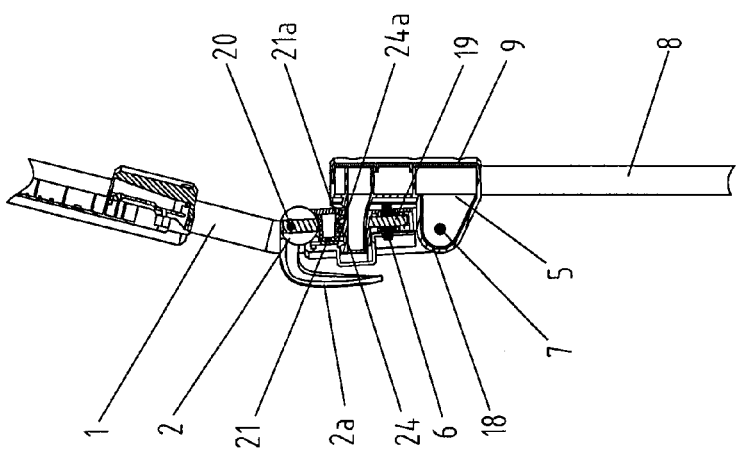
FIG. 4A is an enlarged cross-sectional view taken along line A-A in FIG. 3.

Referring to FIG. 4A, the teeth 24a of the tooth member 24 engage the teeth 21a of the movable tooth member 21. The cam locking member 2 locks the first bracket mechanism 15a to the second bracket mechanism 15b whilst the knob 2a rests on the projecting platform 23.

Figure 6:
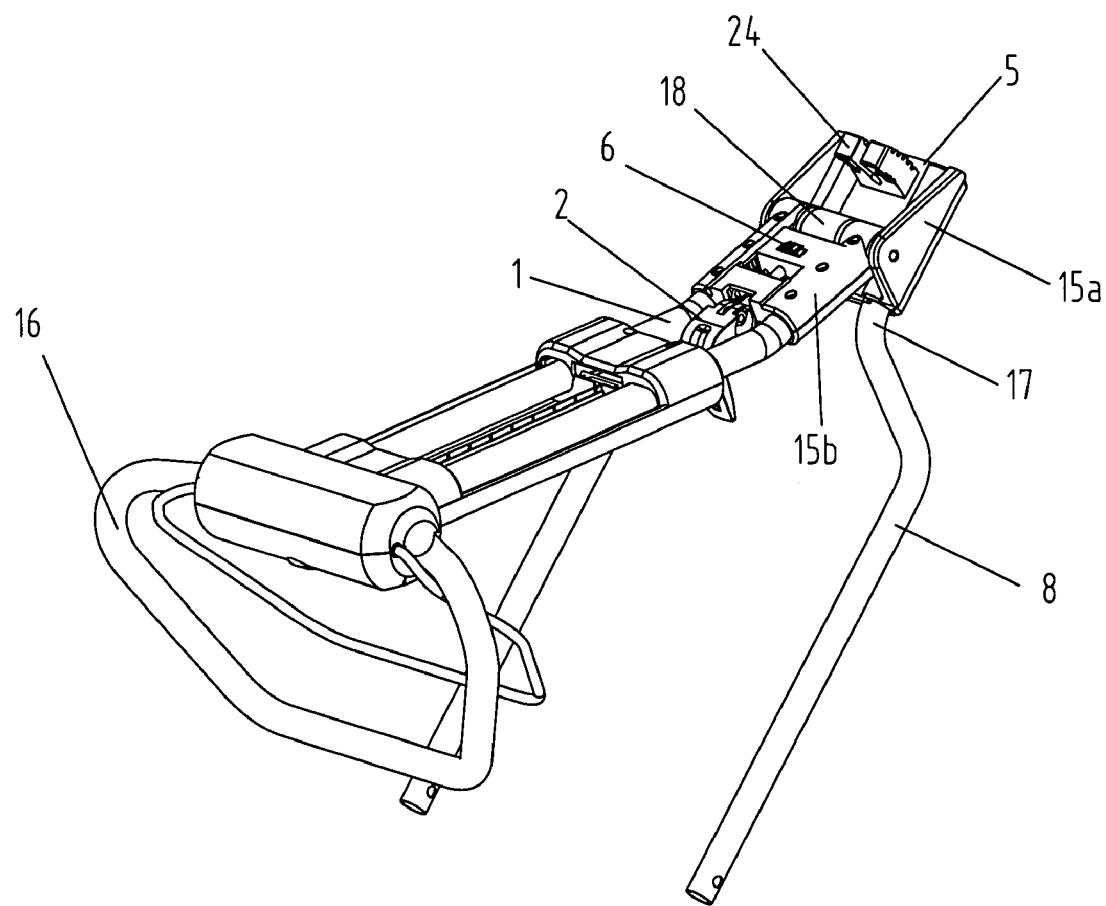
FIG. 6 is a perspective side view of the handle assembly of FIG. 1 shown in a folded state.

Referring to FIG. 4B, the knob 2a has been rotated with respect to the projecting platform 23 and the cam locking member 2 has released the movable tooth member 21 and at the same time, the movable tooth member 21 is urged by the spring 26 to disengage the tooth member 24. The operator can hold the operator grip 16 and make the upper frame 1 pivot (e.g., fold) relative to the lower frame 8 about the spindle 7. For example, the upper frame 1 can be folded forwardly over the lower frame 8 for storage when the tooth member 24 of the lower frame 8 disengages the movable tooth member 21 (see FIG. 6).

FIG. 4C illustrates that the teeth 21a of the movable tooth member 21 can selectively engage the teeth 24a of the tooth member 24 in different three ways. For example, the teeth 21a can engage a first set of engaging points C1, C2, C3 or a second set of engaging points C2, C3, C4 or a third set of engaging points C3, C4, C5 which are formed between adjacent teeth 24a of the tooth member 24. The engaging points C1, C2, C3, C4 and C5 are disposed along an arc with a radius R1 around an axis of the spindle 7.

Figure 5:
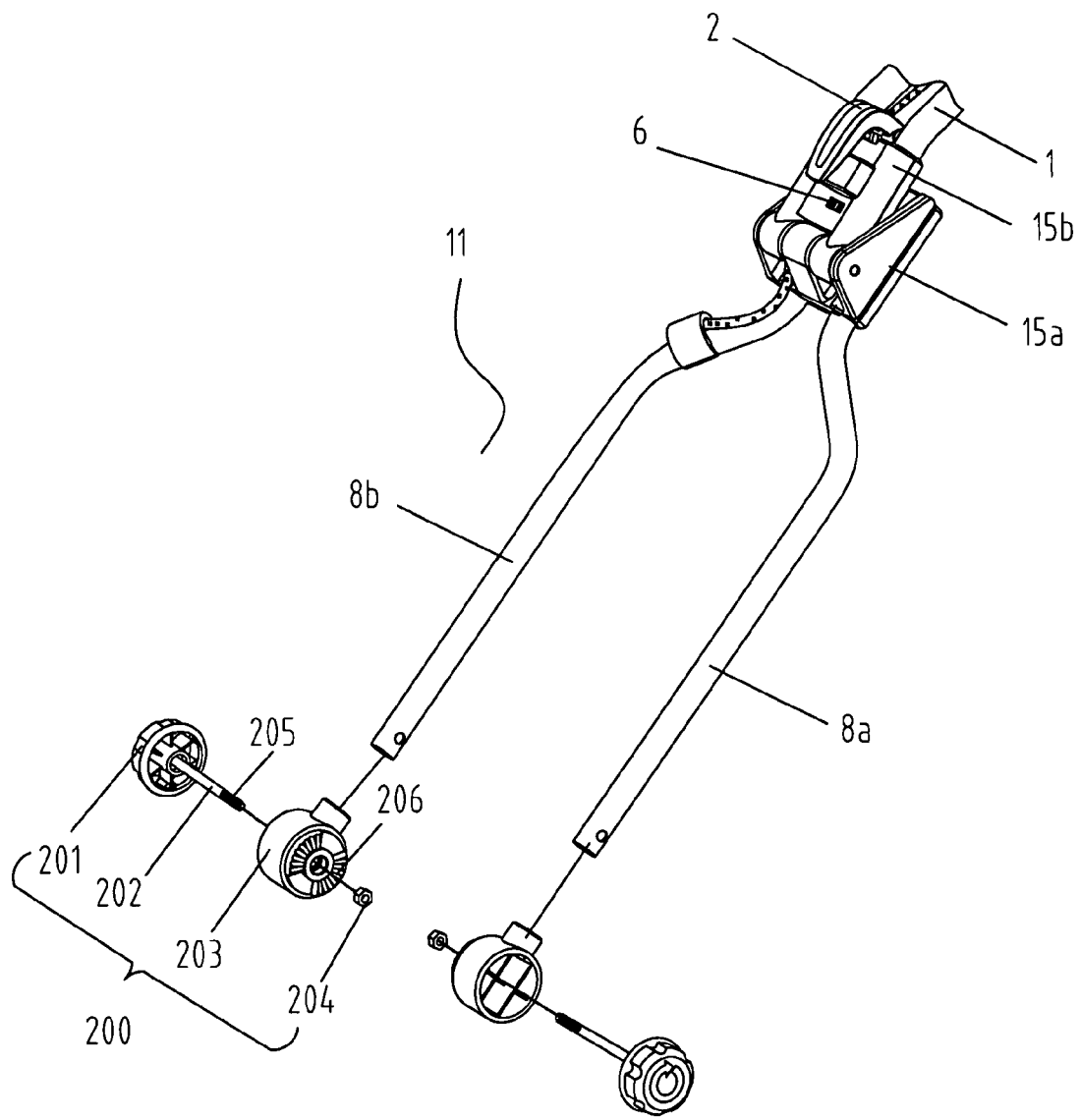
FIG. 5 is a partial exploded view of the handle assembly and coupling assembly between the handle assembly and mower deck.

Referring to FIG. 5 in conjunction with FIG. 1, each proximal end portion of the lower arms 8a, 8b of the lower frame 11 is equipped with a hole and is tabular-shaped and coupled to the main body 10 via a coupling assembly 200. The coupling assembly 200 comprises a circular knob 201, a spindle 202 with a threaded portion 205 fixed to the circular knob 201 and a detent mechanism 203 with a central hole and a detent portion 206 fixed on the end portion of the lower arms 8a. The spindle 202 is inserted into the central hole of the detent mechanism 203 and tightened to a side of the main body 10 by the nut 204 screwed on the threaded portion 205 of the spindle 202. A corresponding detent portion is disposed on the side of the main body 10 (not shown). During use, the detent portion 206 engages the detent portion on the main body 10 and the lower frame 8 is locked to the side of the main body 10 by rotation of the circular knob 201 with respect to the nut 204. The lower frame 8 can be pivoted with respect to the main body 10 until the lower frame 8 substantially overlies the main body 10 when the detent portion 206 disengages the detent portion of the main body 10 by reverse rotation of the circular knob 201.

Figure 7:
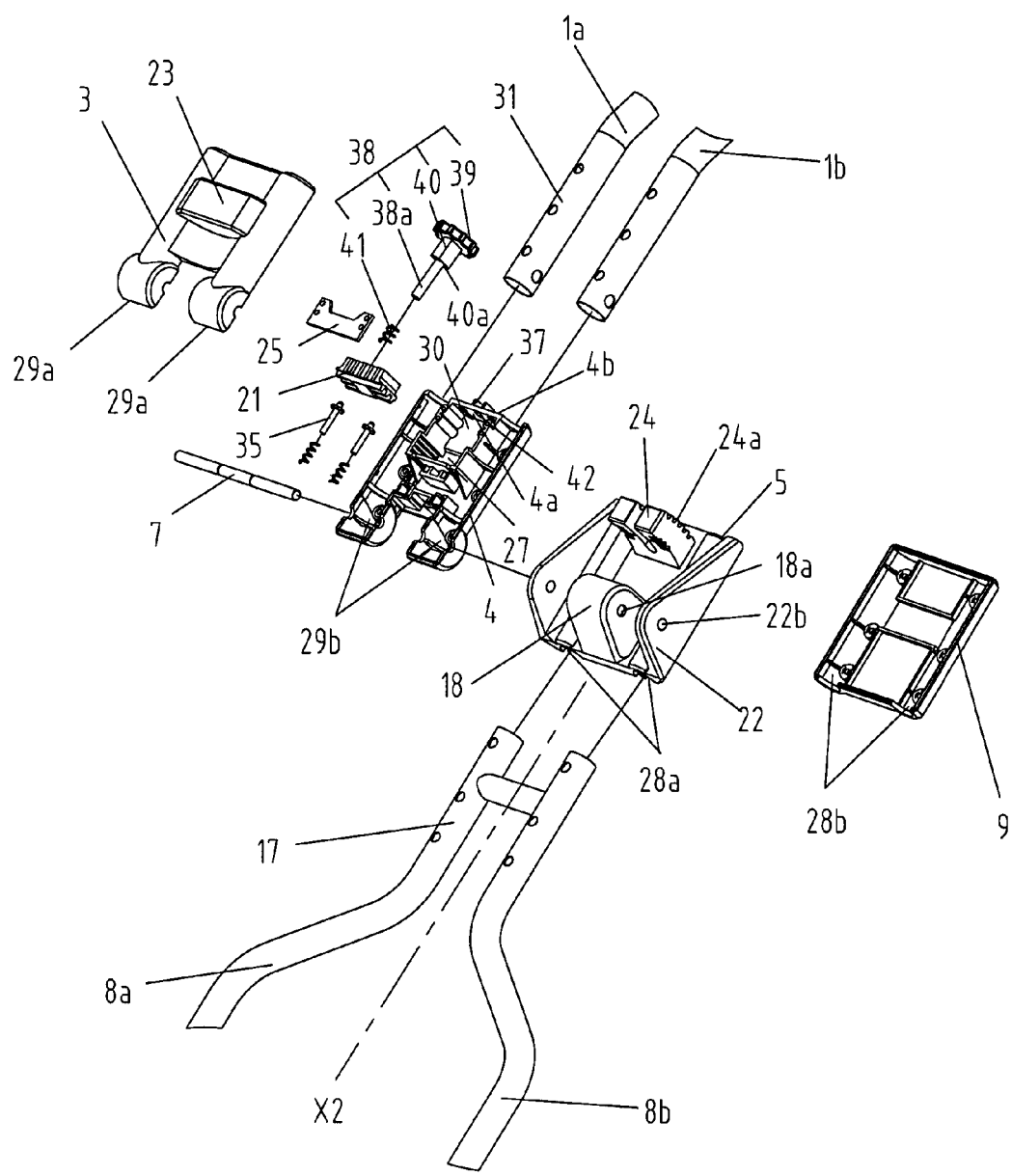
FIG. 7 is a partial exploded view of the handle assembly of the lawn mower according to a second embodiment of the present invention.
Figure 8:
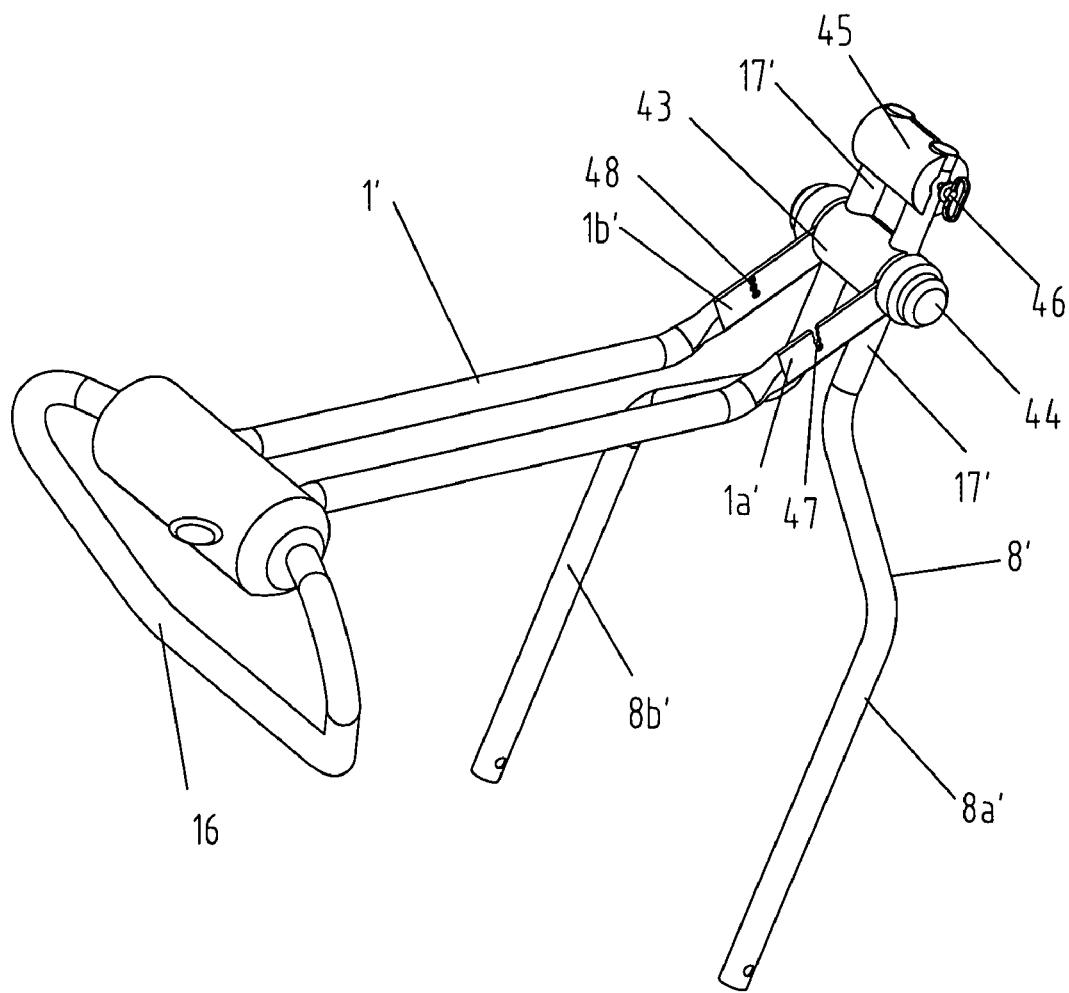
FIG. 8 is a perspective side view of a lawn mower according to a third embodiment of the present invention.
Figure 9:
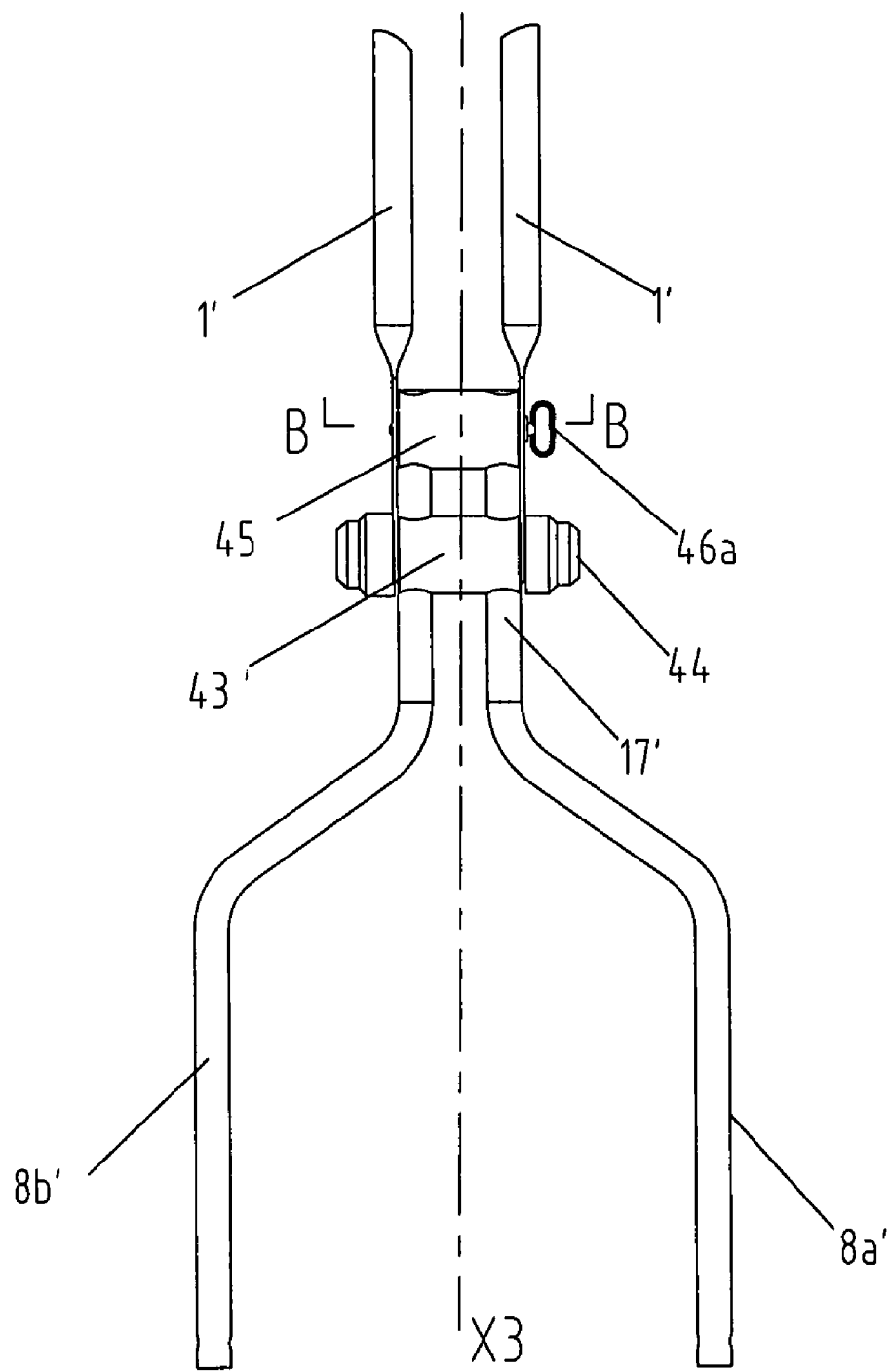
FIG. 9 is a partial front view of the handle assembly of FIG. 8.
Figure 10:
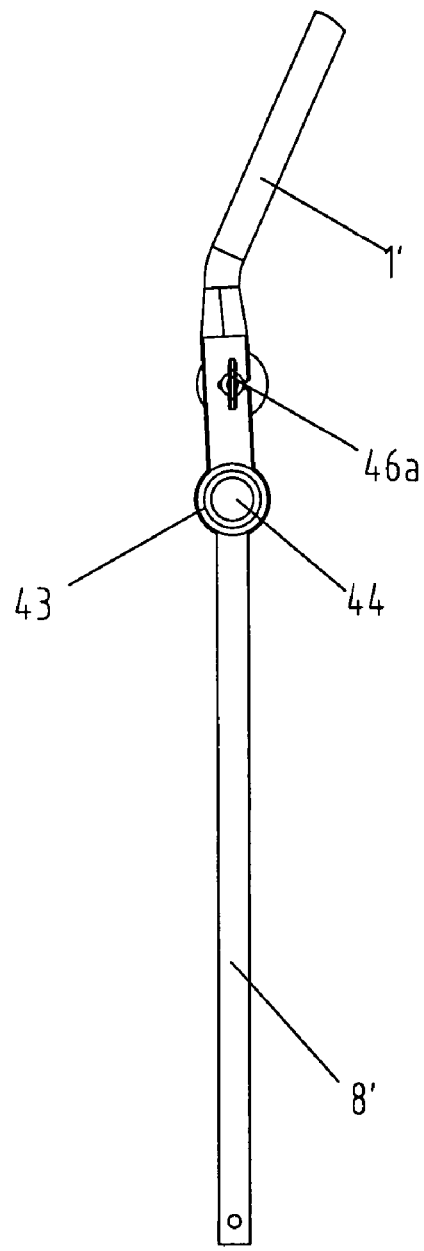
FIG. 10 is a right view of the handle assembly of FIG. 9.
Figure 11:
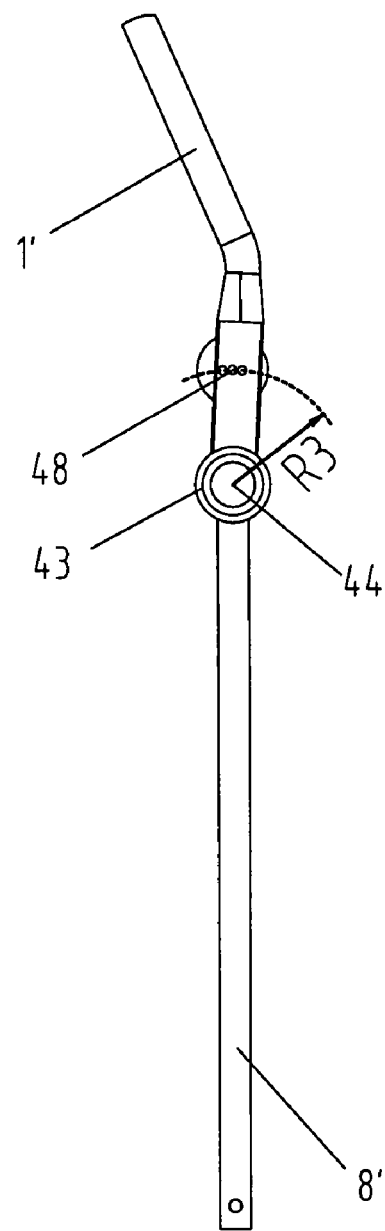
FIG. 11 is a left view of the handle assembly of FIG. 9.

Referring to FIG. 7, there is illustrated a second embodiment of the invention. The construction is similar to the first embodiment and so reference numerals are shared and the detailed description will be brief. In this embodiment, the locking member 38 comprises a rod 38a threaded at a first end. A collar 40 is connected to the rod 38a at a second end. The collar 40 extends along the rod 38a and terminates in a rectangular end section 40a. An external knob 39 is connected to the collar 40. A spring 41 is mounted on the rod 38a between the movable tooth member 21 and an inner face 4a of the lower cover plate 4. A central hole 42 is formed on the inner face 4a. A blind hole (not shown) is formed on a face of the movable tooth member 21 adjacent to the inner face 4a of the lower cover plate 4 such that the rod 38a can be inserted into the central hole 42 and screw into the blind hole. Two convex flanges 37 are adjacent to the central hole 42 on the outer face 4b of the lower cover plate 4. During use, the spring 41 urges the movable tooth member 21 into engagement with the tooth member 24 and the collar 40 engages the two convex flanges 37. When the knob 39 is used to pull the rod 38a outwardly to overcome the elasticity of the spring 41 and disengage the collar 40 from the two convex flanges 37, the movable tooth member 21 disengages the tooth member 24 such that the rod 38a can be rotated 90° with respect to the outer face 4b of the lower cover plate 4. The rectangular cross section 40a of the collar 40 re-engages the two convex flanges 37 when the operator releases the knob 39. An axis of symmetry X2 is defined between the two arms of the lower frame 8 and the knob 39 of the locking member 38 is positioned on the axis X2.

With reference to FIGS. 8, 9, 10 and 11, there is illustrated a third embodiment of the invention. The construction is similar to the first and second embodiments and so reference numerals are shared and the detailed description will be brief. The lower frame 8' comprises a pair of substantially parallel lower arms 8a', 8b' which are bent convergently to form a first joint portion 17'. A rail 43 with an elongate shaft 44 is mounted on the first joint portion 17'. The upper frame 1 comprises a pair of substantially parallel upper arms 1a, 1b each having a tabular shaped end secured to the rail 43 and pivotal about the elongate shaft 44 such that the upper frame 1' is pivotal with respect to the lower frame 8'. An axis of symmetry X3 is defined between the two arms 8a', 8b' of the lower frame 8' and the upper arms 1a', 1b' of the upper frame 1'. A retainer 45 is fixed to the end of the first joint portion 17' and a latch 46 with a knob 46a is received removably in the retainer 45. A lateral slit 47 on the first tabular arm 1a' receives the latch 46. Three slots 48 are correspondingly disposed on the second tabular arm 1b' for selectively engaging the latch 46. The three slots 48 are distributed along an arc with a radius R3 around the elongate shaft 44. The lateral slit 47 is correspondingly arcuate. A radian between each adjacent pair of slots 48 is 5°. Thus the rotational position of the upper frame 1' with respect to the lower frame 8' can be locked at three different positions corresponding to the three slots 48.

Figure 12A:
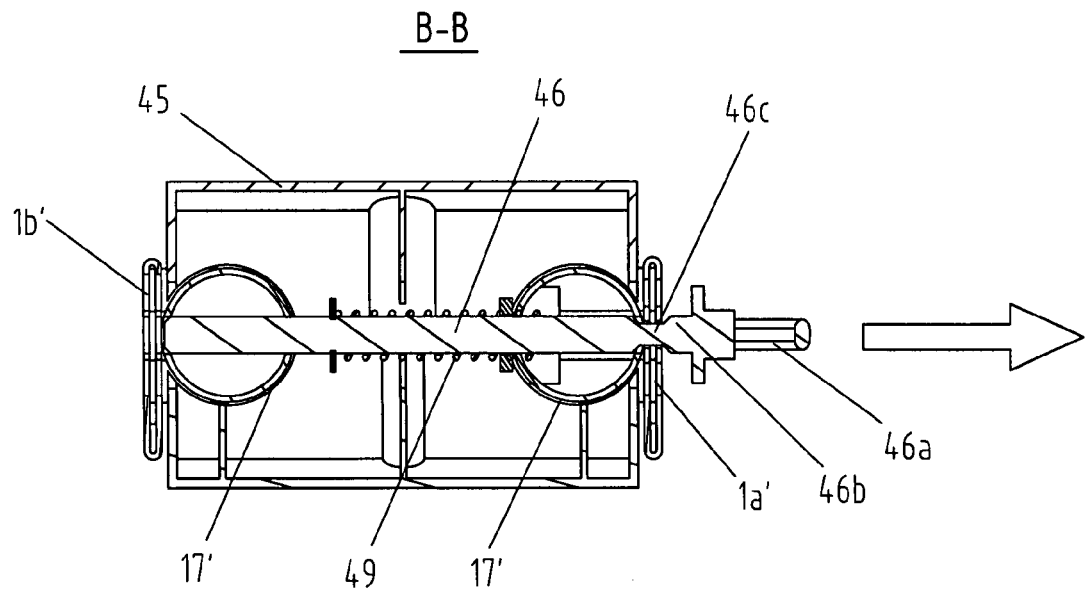
FIG. 12A is an enlarged cross-sectional view taken along line B-B in FIG. 9, wherein the locking arrangement is locked.
Figure 12B:
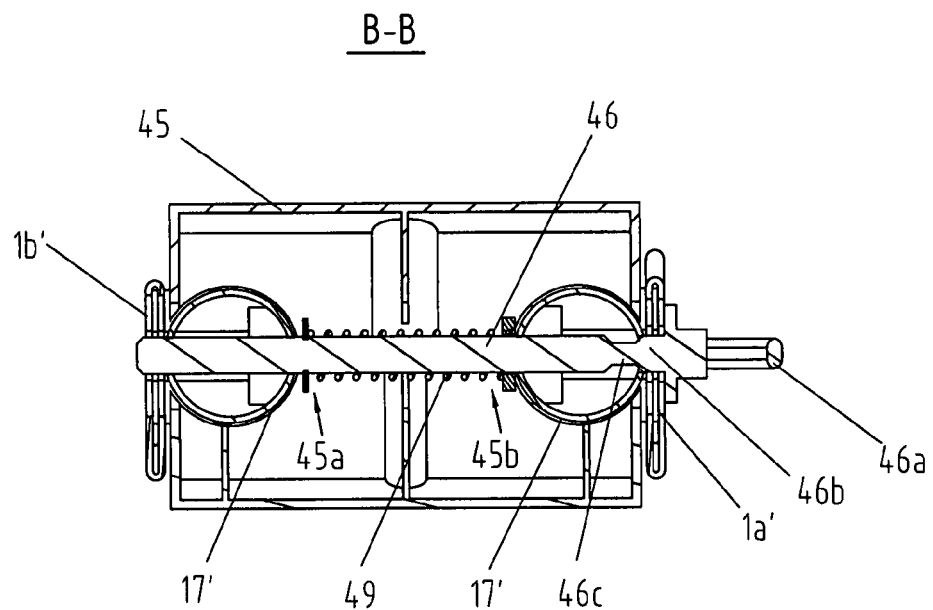
FIG. 12B is an enlarged cross-sectional view taken along line B-B in FIG. 9, wherein the locking arrangement is released.

Referring to FIGS. 12A and 12B, a spring 45 is disposed on the latch 46 and limited between two block plates 45a, 45b. A first end of the latch 46 adjacent to the knob 46a is formed as a small radius portion 46c and a large radius portion 46b. Pulling the knob 46 according to the direction indicated by the arrow to a first position permits the upper frame 1' to pivot about the elongate shaft 44 until it rests against the retainer 45. The lateral slit 47 receives the small radius portion 46c of the latch 46. Once the knob 46a is released from the first position, the latch 46 moves to a second position where the opposite end of the latch 46 engages at least one of the slots 48 under the elasticity of the spring 46. At the same time, the large radius portion 46b of the latch 46 moves to engage the lateral slit 47 and make upper frame 1' lock to the lower frame 8' at this position. If the operator wishes to adjust the operating position of the upper frame 1' with respect to the lower frame 8', he can do so simply by pulling the knob 46a outwards. The upper frame 1' can be pushed or rotated forwardly or rearwardly until it reaches its desired position on the retainer 45 (i.e., the height of the upper frame 1' with respective to the lower frame 8' is adjusted through the engagement of the latch and different slots 48) and the desired position can be locked by releasing the knob 46b. In this embodiment, the height difference caused by the engagement of the latch and each slots 48 is about 35 mm to 40 mm which adequately satisfies different operators. If the operator wishes to store the mower when not in use, he can easily do so by pulling outwards on knob 46 and folding the upper frame 1' forwardly over the lower frame 8'.

Figure 13A:
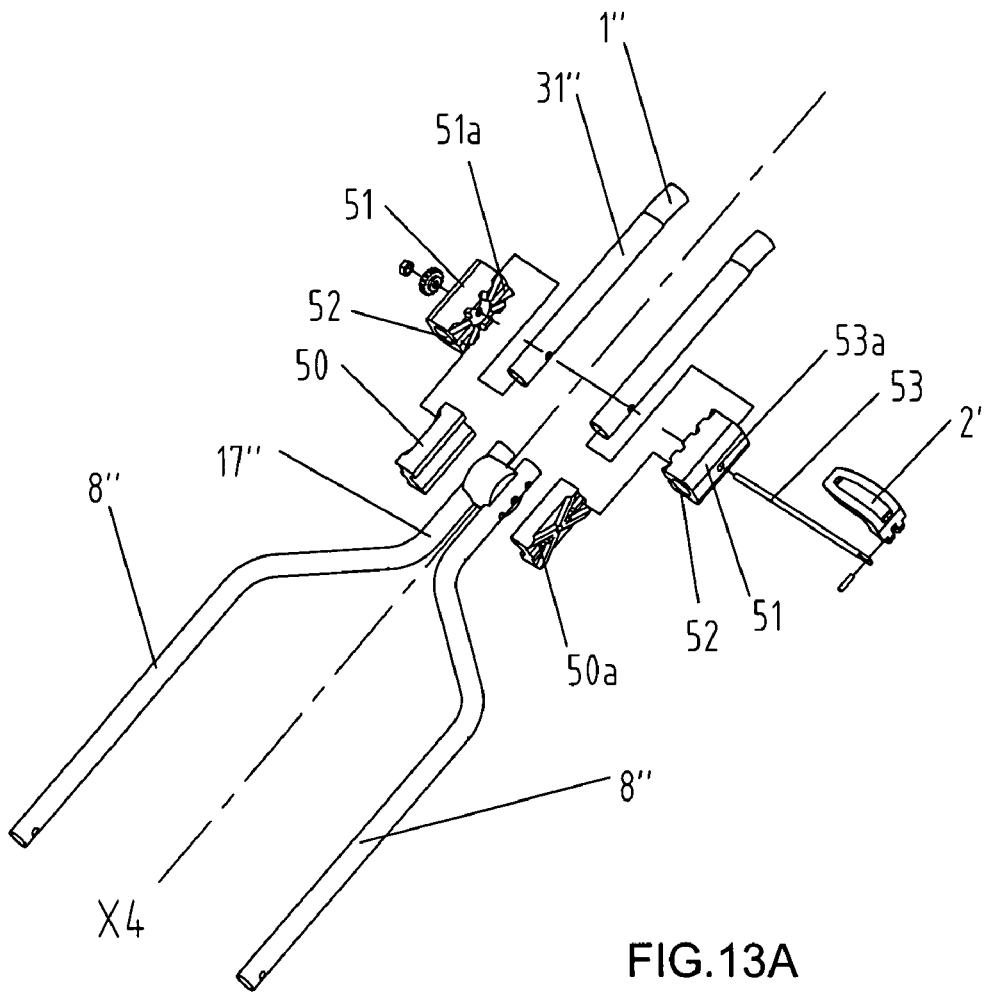
FIG. 13A is a partial exploded view of the handle assembly of the lawn mower according to a fourth embodiment of the present invention.
Figure 13B:
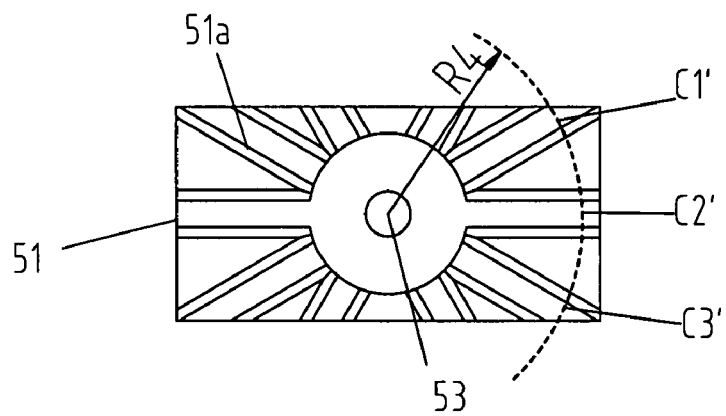
FIG. 13B is a partial enlarged view according to FIG. 13A.

Referring to FIGS. 13A and 13B, there is illustrated a fourth embodiment of the invention. The construction is similar to the foregoing embodiment and so reference numerals are shared and the detailed description will be brief. The lower frame 8" comprises a pair of substantially parallel lower arms 8a", 8b", which are bent convergently into a first joint portion 17". A rail is connected to the first joint portion 17". A first pair of gear members 50 is respectively fixed to outer faces of the first joint portion 17" by screws or other fastening means and each has a central bore. A plurality of gears 50a is disposed on the outer face of each of the first pair of gear members 50. A second pair of gear members 51 each with a plurality of gears 51a on its outer face has a longitudinal bore 52 for mounting radially on the second joint portion 31" of the upper frame 1". Each of the second pair of gear members 51 has a central lateral hole 53a for receiving an elongate shaft 53. A locking member 2' is connected to an end of the elongate shaft 53 by a pin. The distance between the lower arms 8a", 8b" of the first joint portion 17" is smaller than the distance between the arms 1" of the second joint portion 31" and an axis of symmetry X4 is defined between the lower arms 8a", 8b" and the upper arms 1a", 1b". Thus the first pair of gear members 50 is positioned between the second pair of gear members 51 when the elongate shaft 53 extends through their central holes 53a. The free end of the elongate shaft 53 is threaded to receive a nut. The locking member 2' is a cam member adjacent to the axis X4 for locking the second pair of gear members 51 and the first pair of gear members 50 when the gears 51a engage the gears 50a. The cam member can be released from the second pair of gear members 51 and make the upper frame 1" rotate with respect to the lower frame 8" about the elongate shaft 53. The gears 50a and gears 51a are respectively radially disposed on the surface of the first and second pair of gear members 50, 51. Different engaging points (such as C1', C2' and C3) are distributed along an arc with a radius R4 around the elongate shaft 53 such that the gears 51a of the second pair of gear members 51 can selectively engage the gears 50a of the first pair of gear members 50 at different engaging points and cause the height of the upper frame 1" with respect to the lower frame 8" to be adjustable.

Figure 14:
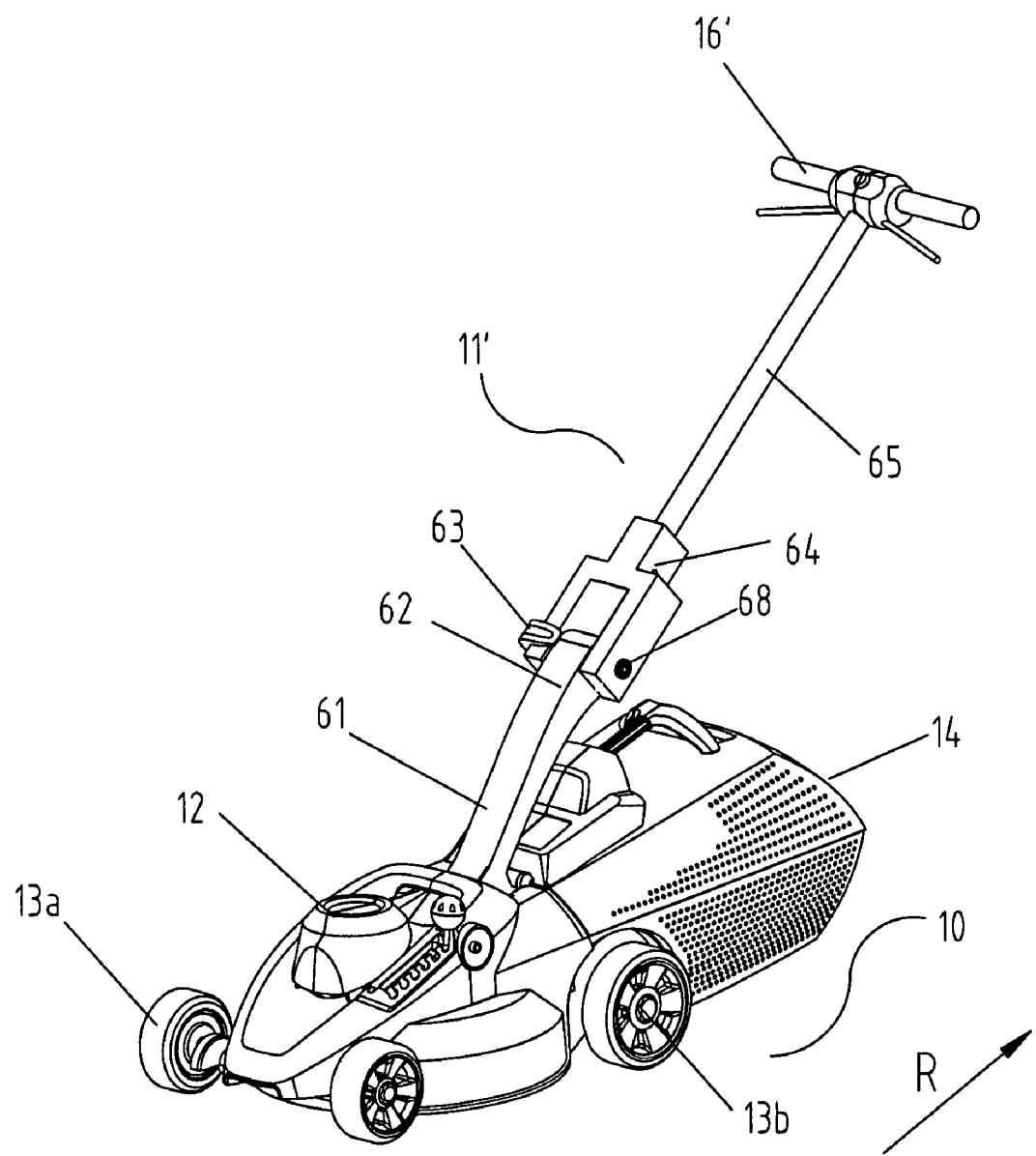
FIG. 14 is a perspective side view of the lawn mower according to a fifth embodiment of the present invention.

Referring to FIG. 14, there is illustrated a fifth embodiment of the invention. The construction is similar to the first embodiment and so reference numerals are shared and the detailed description will be brief. The handle assembly 11' associated with the main body 10 extends substantially rearwardly beyond the main body 10 as indicated by the arrow R and comprises a lower frame 61 and an upper frame 65. The lower frame 61 is a single arm with a proximal end mounted on the main body 1 and a distal end extending into a first joint portion 62. The upper frame 65 is a single arm with a proximal end forming a joint portion 64 which is pivotally coupled to the joint portion 62 and a distal end fixed to an operating handle grip 16'. The second joint portion 64 is a fork with two limbs 64a, 64b such that the first joint portion 62 is positioned between the two limbs 64a, 64b and is pivotal with respect to the second joint portion 64 about an elongate shaft 68.

Figures 15A, 15B:
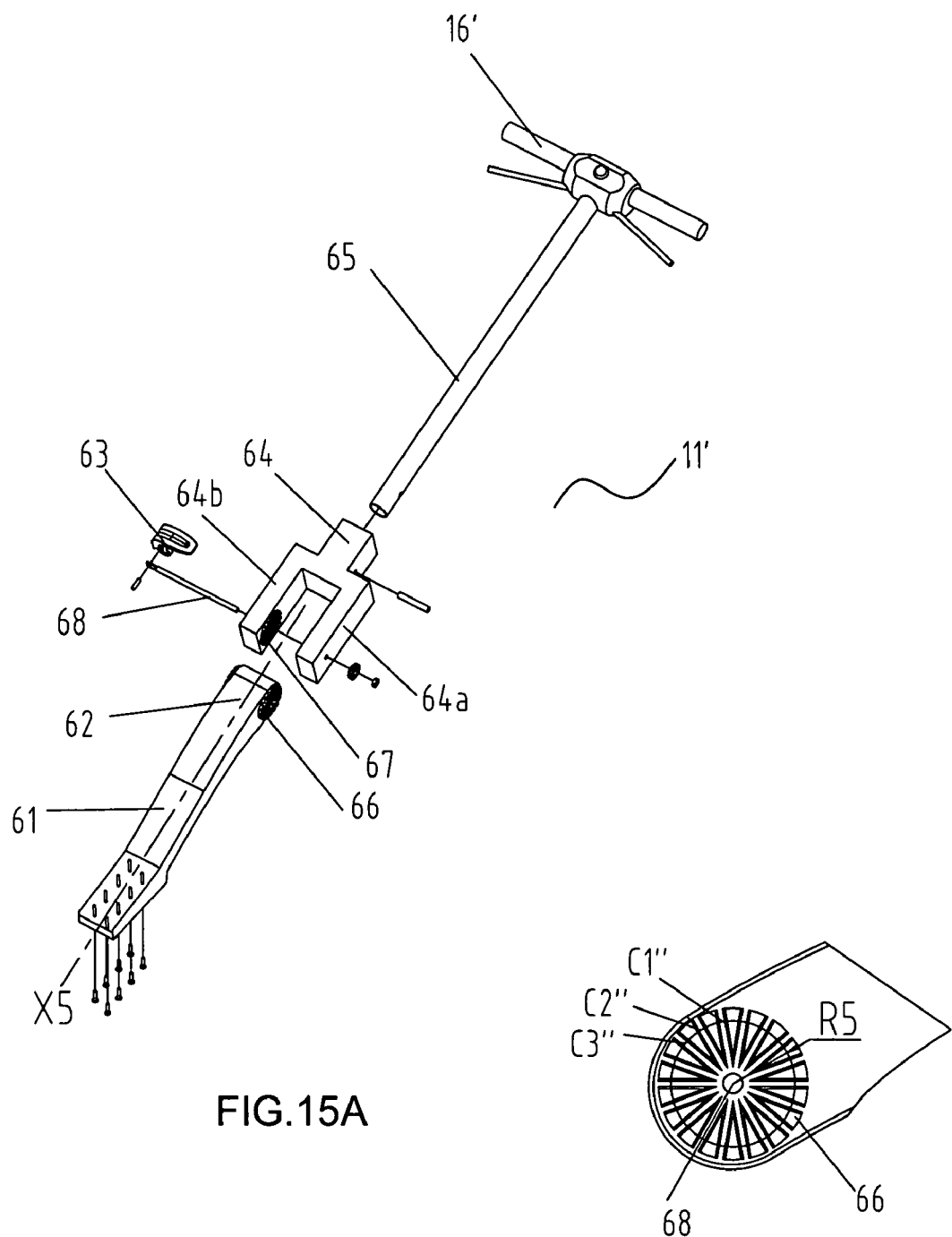
FIG. 15A is a partial exploded view of the handle assembly according to FIG. 14.
FIG. 15B is a partial enlarged view according to FIG. 15A.

Referring to FIGS. 15A and 15B, a symmetrical axis X5 lies on the lower frame 61 and between the two limbs 64a, 64b of the upper frame 65. A first pair of gears 66 are respectively disposed on the outer faces of the first joint portion 62 and a second pair of gears 67 are respectively disposed on the inner faces of the limbs 64a, 64b of the second joint portion 64. Each gear is equipped with a central hole for receiving the elongate shaft 68. A cam locking arrangement 63 adjacent to the symmetrical axis X5 is rotationally coupled to a first end of the elongate shaft 68 by a pin. One or more nuts threadedly engage the second end of the elongate shaft 68 for locking the first joint portion 62 and the second joint portion 64 such that the gears 66 selectively engaged the gears 67 when the cam locking arrangement 63 is released from the elongate shaft 68. Thus the relative heights of the upper frame 65 and the lower frame 61 are adjustable. The engaging points C1", C2" and C3" on the gears 66 or 67 are distributed along an arc with a radius R5 around the elongate shaft 68.

Thus, the preceding embodiments of the invention provide a single locking member for locking the position of selected engagement of the selected one or set of the plurality of engaging points with the first engaging unit or second engaging unit. The adjustment between the upper frame and the lower frame is therefore more convenient and quick.

What is claimed is:

1. A grass mower comprising:
   a main body provided with a first and second side capable of guided movement adjacent to and over the ground;
   a motor contained in a motor housing of the main body;
   a cutting unit driven by the motor disposed in the motor housing;
   an elongate handle assembly extending rearwardly from the main body into a handle to permit an operator to guide the main body during its guided movement over the ground, wherein the elongate handle assembly includes a lower frame including a pair of lower arms each having a proximal end secured to the first and second side of the main body respectively and a distal end to form a first joint portion and an upper frame provided with a second joint portion;
   an elongate shaft for pivotally coupling the second joint portion to the first joint portion such that the relative position of the upper frame and the lower frame is rotationally adjustable;
   a first engaging unit carried on the first joint portion and a second engaging unit carried on the second joint portion, wherein
      either the first engaging unit is equipped with a plurality of engaging points which is disposed along an arc around the elongate shaft, wherein the second engaging unit is selectively engageable with more than one selected one or set of the plurality of engaging points, or
      the second engaging unit is equipped with a plurality of engaging points which is disposed along an arc around the elongate shaft, wherein the first engaging unit is selectively engageable with more than one selected one or set of the plurality of engaging points; and
   at least one locking arrangement for locking the position of selected engagement of the selected one or set of the plurality of engaging points with the first engaging unit or second engaging unit wherein the locking arrangement comprises a locking member disposed between the lower arms.

2. The grass mower according to claim 1, wherein the at least one locking arrangement is disposed adjacent to or along an axis of symmetry of the lower frame.

3. The grass mower according to claim 1, wherein the lower frame comprises a pair of substantially parallel lower arms extending rearwardly from the main body, wherein the upper frame comprises a pair of substantially parallel upper arms and a closed operator grip for the operator to hold.

4. The grass mower according to claim 1, further comprising:
a first bracket mechanism mounted on the first joint portion; and
a second bracket mechanism mounted on the second joint portion wherein the first engaging unit is mounted in the first bracket mechanism and the second engaging unit is mounted in the second bracket mechanism.

5. The grass mower according to claim 4, wherein the first engaging unit is a tooth member and the second engaging unit is a movable tooth member, wherein the teeth of the tooth member are selectively meshable with more than one selected one or set of the teeth of the movable tooth member.

6. The grass mower according to claim 5, wherein the first bracket mechanism comprises an upper cover plate and a lower cover plate, wherein the tooth member is seated in a cavity on the upper cover plate, wherein the upper cover plate has a pair of substantially parallel spaced-apart, substantially semi-circular axial slots and the lower cover plate has a pair of substantially parallel spaced-apart, substantially semi-circular axial slots whereby the pair of substantially parallel lower arms are captured between the substantially parallel spaced-apart, substantially semi-circular axial slots of the upper cover plate and the substantially parallel spaced-apart, substantially semi-circular axial slots of the lower cover plate.

7. The grass mower according to claim 6, wherein the upper cover plate is mounted radially on the elongate shaft and the first bracket mechanism and the second bracket mechanism are pivotal about the elongate shaft.

8. The grass mower according to claim 5, wherein the tooth member has six teeth disposed along an arc around an axis of the elongate shaft.

9. The grass mower according to claim 5, wherein the second bracket mechanism comprises an upper cover plate and a lower cover plate wherein the movable tooth member is seated in a cavity in the upper cover plate, wherein the upper cover plate has a pair of substantially parallel spaced-apart, substantially semi-circular axial slots and the lower cover plate has a pair of substantially parallel spaced-apart, substantially semi-circular axial slots whereby the pair of substantially parallel upper arms are captured between the substantially parallel spaced-apart, substantially semi-circular axial slots of the upper cover plate and the substantially parallel spaced-apart, substantially semi-circular axial slots of the lower cover plate.

10. The grass mower according to claim 5, wherein the movable tooth member has three teeth disposed along an arc around an axis of the elongate shaft.

11. The grass mower according to claim 5, wherein the at least one locking arrangement comprises:
an axial spindle with a first end and a second end; and
a cam locking member connected to the second end of the axial spindle, wherein the movable tooth member has a central bore for receiving the first end of the axial spindle.

12. The grass mower according to claim 11, wherein the locking arrangement further comprises:
a biasing element with a tendency to bias the movable tooth member into disengagement with the tooth member, wherein when the cam locking member is released the biasing element biases the movable tooth member into disengagement with the tooth member.

13. The grass mower according to claim 10, wherein the locking arrangement is a manually retractable locking member which is threadedly fastened to the movable tooth member.

14. The grass mower according to claim 13, wherein the locking arrangement further comprises:
a biasing element with a tendency to bias the movable tooth member into engagement with the tooth member, wherein when the retractable locking member is retracted the biasing element releases the movable tooth member into disengagement from the tooth member.

15. The grass mower according to claim 2, wherein the first engaging unit is a first pair of gears mounted on the outer face of the first joint portion and the second engaging unit is a second pair of gears mounted radially on the second joint portion, wherein
either the first pair of gears is equipped with a plurality of engaging points which is disposed along an arc around the elongate shaft and the second pair of gears (51) is selectively engageable with more than one selected one or set of the plurality of engaging points, or
the second pair of gears is equipped with a plurality of engaging points C3') which is disposed along an arc around the elongate shaft, wherein the first pair of gears is selectively engageable with more than one selected one or set of the plurality of engaging points.

16. The grass mower according to claim 15, wherein the first and second pairs of gears and the joint portions are mounted radially on the elongate shaft, wherein the locking arrangement is a cam locking member (2')coupled to a first end of the elongate shaft.

17. The grass mower according to claim 1, wherein the lower frame is a single arm connected to the main body at a proximal end and has a first joint portion disposed at the distal end, wherein the upper frame is a single arm which has an operating handle grip at a distal end and has a second joint portion being a fork at a proximal end.

18. The grass mower according to claim 17, wherein the first engaging unit is a first pair of gears mounted respectively on the outer face of the first joint portion and the second engaging unit is a second pair of gears mounted respectively on the inner face of the fork of the second joint portion wherein
either the first pair of gears (66) is equipped with a plurality of engaging points which is disposed along an arc around the elongate shaft and the second pair of gears is selectively engageable with more than one selected one or set of the plurality of engaging points, or
the second pair of gears is equipped with a plurality of engaging points which is disposed along an arc around the elongate shaft (68), wherein the first pair of gears is selectively engageable with more than one selected one or set of the plurality of engaging points.

19. A grass mower according to claim 2, wherein the axis of symmetry is a longitudinal axis of symmetry between the pair of arms of the lower frame and the locking member is positioned on the axis of symmetry.

* * * * *